(12) United States Patent
Matsui et al.

(10) Patent No.: US 7,697,847 B2
(45) Date of Patent: Apr. 13, 2010

(54) DISPERSION COMPENSATOR FOR FREQUENCY RESHAPED OPTICAL SIGNALS

(75) Inventors: Yasuhiro Matsui, Woburn, MA (US); Xueyan Zheng, Andover, MA (US)

(73) Assignee: Finisar Corporation, Sunnyvale, CA (US)

( * ) Notice: Subject to any disclaimer, the term of this patent is extended or adjusted under 35 U.S.C. 154(b) by 174 days.

(21) Appl. No.: 12/061,508

(22) Filed: Apr. 2, 2008

(65) Prior Publication Data

US 2008/0240733 A1    Oct. 2, 2008

Related U.S. Application Data

(60) Provisional application No. 60/921,402, filed on Apr. 2, 2007.

(51) Int. Cl.
*H04B 10/04* (2006.01)
*H04B 10/18* (2006.01)

(52) U.S. Cl. .......................... 398/147; 398/201

(58) Field of Classification Search .............. 398/157, 398/201
See application file for complete search history.

(56) References Cited

U.S. PATENT DOCUMENTS

| | | | |
|---|---|---|---|
| 3,324,295 A | 6/1967 | Harris | |
| 3,999,105 A | 12/1976 | Archey et al. | |
| 4,038,600 A | 7/1977 | Thomas | |
| 4,561,119 A | 12/1985 | Epworth | |
| 4,805,235 A | 2/1989 | Henmi | |
| 4,841,519 A | 6/1989 | Nishio | |
| 5,293,545 A | 3/1994 | Huber | |
| 5,325,378 A | 6/1994 | Zorabedian | |
| 5,371,625 A | 12/1994 | Wedding et al. | |
| 5,412,474 A | 5/1995 | Reasenberg et al. | |
| 5,416,629 A | 5/1995 | Huber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,592,327 A | 1/1997 | Gabl et al. | |
| 5,737,104 A | 4/1998 | Lee et al. | |
| 5,777,773 A | 7/1998 | Epworth et al. | |

(Continued)

FOREIGN PATENT DOCUMENTS

GB    2 107 147    4/1983

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.

(Continued)

*Primary Examiner*—Leslie Pascal
(74) *Attorney, Agent, or Firm*—Workman Nydegger

(57) ABSTRACT

An optical transmitter is disclosed including an optical signal source generating a frequency modulated signal encoding data. An optical spectrum reshaper is positioned to receive the frequency modulated signal and converts the frequency modulated signal into a reshaped signal having increased amplitude modulation relative to the frequency modulated signal. A third-order dispersive element is positioned to receive the reshaped signal and is adapted to impose third-order dispersion on the reshaped signal to generate a compensated signal having third-order dispersion effective to compensate for second-order dispersion caused by an optical fiber positioned between the optical transmitter and a receiver.

21 Claims, 4 Drawing Sheets

U.S. PATENT DOCUMENTS

| | | |
|---|---|---|
| 5,805,235 A | 9/1998 | Bedard |
| 5,856,980 A | 1/1999 | Doyle |
| 5,920,416 A | 7/1999 | Beylat et al. |
| 5,953,139 A | 9/1999 | Nemecek et al. |
| 5,974,209 A | 10/1999 | Cho et al. |
| 6,081,361 A | 6/2000 | Adams et al. |
| 6,096,496 A | 8/2000 | Frankel |
| 6,104,851 A | 8/2000 | Mahgerefteh |
| 6,115,403 A | 9/2000 | Brenner et al. |
| 6,222,861 B1 | 4/2001 | Kuo et al. |
| 6,271,959 B1 | 8/2001 | Kim et al. |
| 6,298,186 B1 | 10/2001 | He |
| 6,331,991 B1 | 12/2001 | Mahgerefteh |
| 6,359,716 B1 | 3/2002 | Taylor |
| 6,473,214 B1 | 10/2002 | Roberts et al. |
| 6,506,342 B1 | 1/2003 | Frankel |
| 6,563,623 B1 | 5/2003 | Penninckx et al. |
| 6,577,013 B1 | 6/2003 | Glenn et al. |
| 6,618,513 B2 | 9/2003 | Evankow, Jr. |
| 6,654,564 B1 | 11/2003 | Colbourne et al. |
| 6,665,351 B2 | 12/2003 | Hedberg et al. |
| 6,687,278 B1 | 2/2004 | Mason et al. |
| 6,748,133 B2 | 6/2004 | Liu et al. |
| 6,778,307 B2 | 8/2004 | Clark |
| 6,810,047 B2 | 10/2004 | Oh et al. |
| 6,834,134 B2 | 12/2004 | Brennan et al. |
| 6,836,487 B1 | 12/2004 | Farmer et al. |
| 6,847,758 B1 | 1/2005 | Watanabe |
| 6,947,206 B2 | 9/2005 | Tsadka et al. |
| 6,963,685 B2 | 11/2005 | Mahgerefteh et al. |
| 7,013,090 B2 | 3/2006 | Adachi et al. |
| 7,054,538 B2 | 5/2006 | Mahgerefteh et al. |
| 7,076,170 B2 | 7/2006 | Choa |
| 7,123,846 B2 | 10/2006 | Tateyama et al. |
| 7,263,291 B2 | 8/2007 | Mahgerefteh et al. |
| 7,280,721 B2 | 10/2007 | McCallion et al. |
| 2002/0154372 A1 | 10/2002 | Chung et al. |
| 2002/0159490 A1 | 10/2002 | Karwacki |
| 2002/0176659 A1 | 11/2002 | Lei et al. |
| 2003/0002120 A1 | 1/2003 | Choa |
| 2003/0067952 A1 | 4/2003 | Tsukiji et al. |
| 2003/0099018 A1 | 5/2003 | Singh et al. |
| 2003/0147114 A1 | 8/2003 | Kang et al. |
| 2003/0193974 A1 | 10/2003 | Frankel et al. |
| 2004/0008933 A1 | 1/2004 | Mahgerefteh et al. |
| 2004/0008937 A1 | 1/2004 | Mahgerefteh et al. |
| 2004/0036943 A1 | 2/2004 | Freund et al. |
| 2004/0076199 A1 | 4/2004 | Wipiejewski et al. |
| 2004/0096221 A1 | 5/2004 | Mahgerefteh et al. |
| 2004/0218890 A1 | 11/2004 | Mahgerefteh et al. |
| 2005/0100345 A1 | 5/2005 | Welch et al. |
| 2005/0111852 A1 | 5/2005 | Mahgerefteh et al. |
| 2005/0175356 A1 | 8/2005 | McCallion et al. |
| 2005/0206989 A1 | 9/2005 | Marsh |
| 2005/0271394 A1 | 12/2005 | Whiteaway et al. |
| 2005/0286829 A1 | 12/2005 | Mahgerefteh et al. |
| 2006/0002718 A1 | 1/2006 | Matsui et al. |
| 2006/0018666 A1 | 1/2006 | Matsui et al. |
| 2006/0029358 A1 | 2/2006 | Mahgerefteh et al. |
| 2006/0029396 A1 | 2/2006 | Mahgerefteh et al. |
| 2006/0029397 A1 | 2/2006 | Mahgerefteh et al. |
| 2006/0228120 A9 | 10/2006 | McCallion et al. |
| 2006/0233556 A1 | 10/2006 | Mahgerefteh et al. |
| 2006/0274993 A1 | 12/2006 | Mahgerefteh et al. |

FOREIGN PATENT DOCUMENTS

| | | |
|---|---|---|
| WO | 9905804 | 2/1999 |
| WO | 0104999 | 1/2001 |
| WO | 03005512 | 7/2002 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators,Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutali et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-μm InGaAlAs Multiquantum Well Ridge Waveguide Distributed Feedback Lasers, IEEE Photonics Technology Leters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

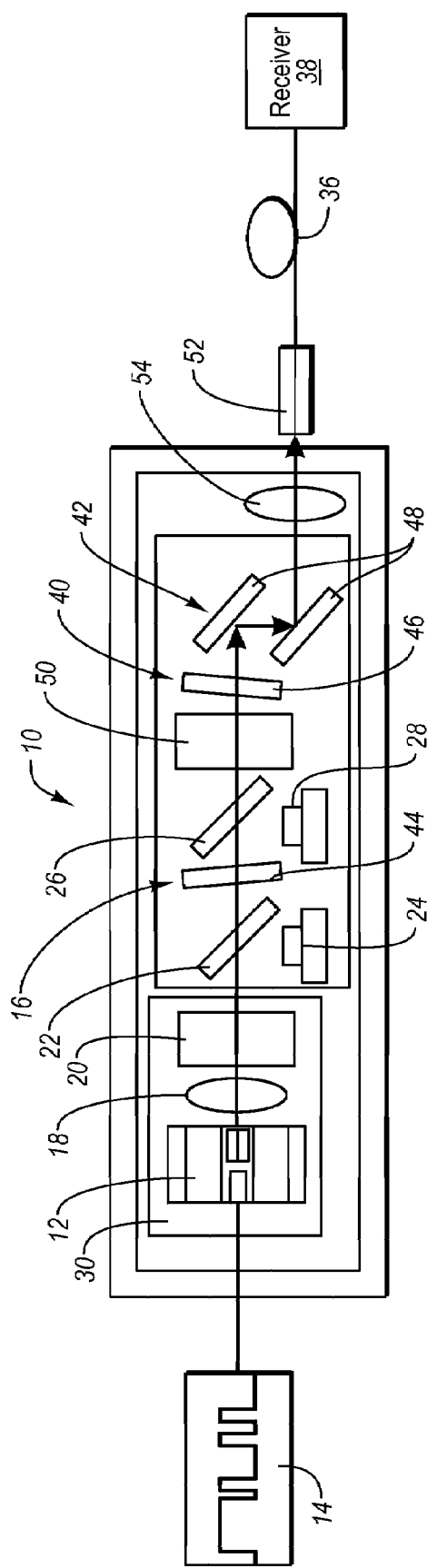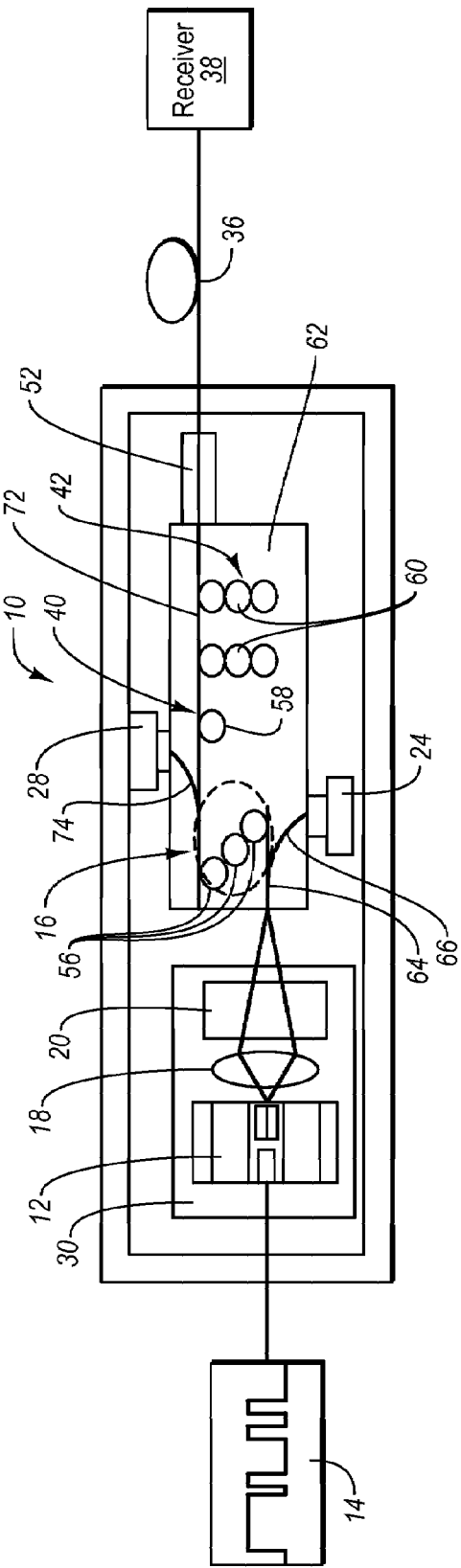

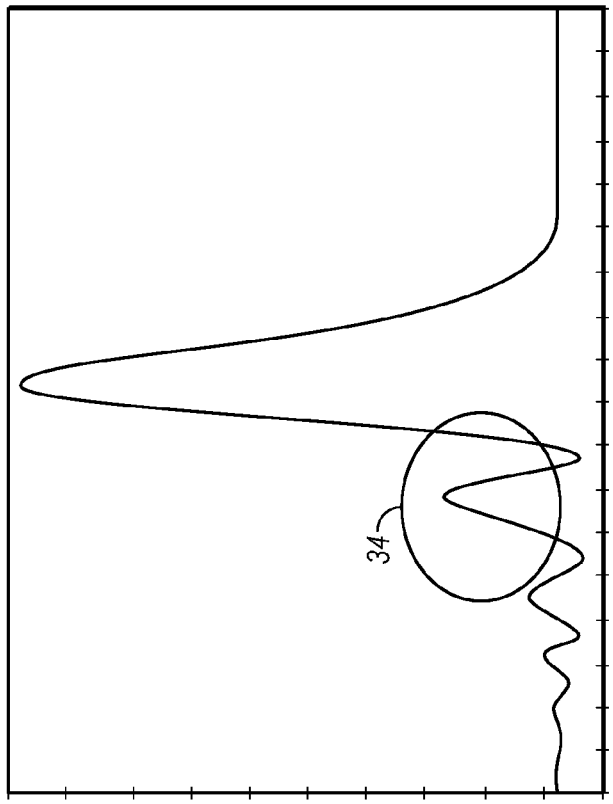
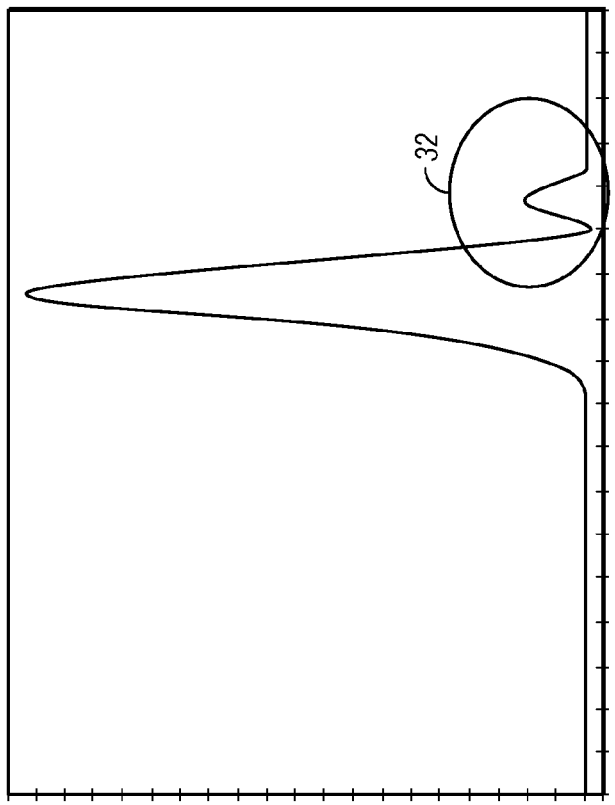

DISPERSION COMPENSATOR FOR FREQUENCY RESHAPED OPTICAL SIGNALS

CROSS-REFERENCE TO RELATED APPLICATIONS

This application claims the benefit of U.S. Provisional Application Ser. No. 60/921,402 filed Apr. 2, 2007.

BACKGROUND OF THE INVENTION

1. The Field of the Invention

This application relates to optical transmitters and, more particularly to systems and methods for overcoming chromatic dispersion.

2. The Relevant Technology

The ability to transmit data over optical fibers over long distances is limited by various factors. For example, at intermediate stages between transmitter and receiver a signal may be amplified, which introduces noise into the signal. The signal may also be converted to an electrical signal and then retransmitted, which is subject to detection errors.

The primary limitation on long-haul transmission of optical signals is dispersion within the optical fiber itself Inasmuch as the optical fiber has a wavelength dependent index of refraction, different frequency components of a signal travel at different speeds. Transmitted pulses will therefore tend to broaden, causing the peak amplitude of 1 bits to be reduced and the amplitude of adjacent 0 bits to increase thereby making the transmitted symbols indistinguishable from one another.

U.S. patent application Ser. No. 11/084,633, filed Mar. 18, 2005, and entitled "Method and apparatus for transmitting a signal using simultaneous FM and AM modulation," described a laser transmitter including a directly modulated laser that emits frequency modulated pulses through an optical spectrum reshaper that converts a portion of the frequency modulation to amplitude modulation. In this application, the frequency modulated signal includes frequency excursions from a base frequency to a peak frequency. The application discloses that for frequency excursions equal to between 0.25 and 0.75 times a bit rate, 1 bits separated by an odd number of 0 bits will destructively interfere as they broaden and begin to overlap, which makes an intervening 0 bit more readily distinguishable. Although this method is particularly useful for promoting proper detection of the 101 bit sequence, it does not provide any benefit for isolated 1 bits among multiple 0 bits.

In view of the foregoing, it would be an advancement in the art to provide a laser transmitter having a directly modulated laser and optical spectrum reshaper that reduces errors caused by chromatic dispersion for a plurality of bit patterns, particularly isolated 1 bits.

BRIEF SUMMARY OF THE INVENTION

In one aspect of the invention, an optical transmitter includes a digital signal source configured to output a data signal. An optical signal source, such as a DFB laser receives a data signal from the digital signal source and generates a frequency modulated signal encoding the data signal. An optical spectrum reshaper is positioned to receive the frequency modulated signal and converts the frequency modulated signal into a reshaped signal having increased amplitude modulation relative to the frequency modulated signal. A third-order dispersive element is positioned to receive the reshaped signal and is adapted to impose third-order dispersion on the reshaped signal to generate a compensated signal. An optical fiber has a first end positioned to receive the compensated signal and a second end coupled to a receiver. The third-order dispersive element imposes third-order dispersion on the reshaped signal effective to compensate for second-order dispersion caused by the optical fiber.

In another aspect of the invention, the third-order dispersive element is a filter having a Gaussian profile and wherein the reshaped signal has a frequency profile positioned relative to the transmission function of the Gaussian profile such that the reshaped signal experiences third-order dispersion.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1A illustrates an optical transmitter having dispersion compensating components formed of Gire-Tournois filters in accordance with an embodiment of the present invention;

FIG. 1B illustrates an optical transmitter having dispersion compensating components formed of ring resonator filters in accordance with an embodiment of the present invention;

FIG. 2A illustrates the effect of third-order dispersion on a Gaussian pulse;

FIG. 2B illustrates the effect of second-order dispersion on a frequency reshaped pulse;

DETAILED DESCRIPTION OF THE PREFERRED EMBODIMENTS

Figure 3A:
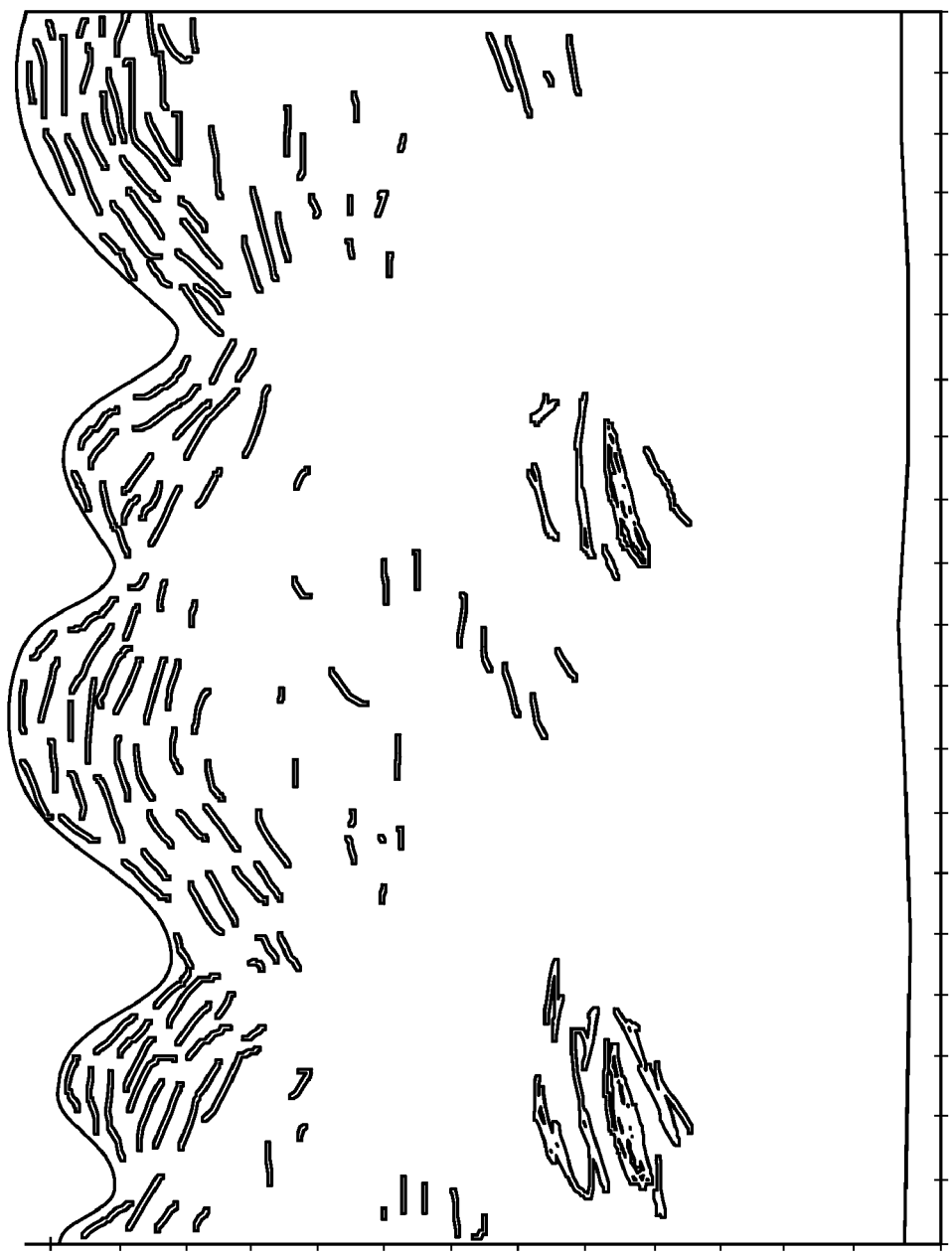
FIG. 3A illustrates an eye diagram for a frequency reshaped pulse after transmission through 400 km of fiber.

Referring to FIGS. 1A and 1B, an optical transmitter 10 includes a laser 12 coupled to a digital signal source 14. The laser 12 may include a distributed feed back (DFB), distributed bragg reflector (DBR), or other type of laser. The laser 12 is preferably directly modulated such that the output of the laser encodes a data signal from the digital signal source 14. In a preferred embodiment, the output of the laser 12 includes adiabatically chirped pulses having both frequency and amplitude modulation. The laser 12 is preferably biased above its lasing threshold such that transient chirp caused by modulation of the laser is reduced.

The output of the laser 12 is transmitted through an optical spectrum reshaper (OSR) 16. The OSR 16 converts at least a portion of frequency modulation in the output of the laser 12 to amplitude modulation. The output of the OSR 16 may also remain frequency modulated. The OSR 16 may be embodied as one or more filters, including, but not limited to, a coupled multi-cavity (CMC) filter, a periodic multi-cavity etalon, a fiber Bragg grating, a ring resonator filter or any other optical element having a wavelength-dependent loss. The OSR 16 may also include a fiber, a Gire-Tournois filter, or some other element with chromatic dispersion.

The OSR 16 preferably has a frequency dependent transmission profile such that the frequency modulation bandwidth of the laser 12 lies on a sloped portion or "transmission edge" of the transmission profile. The laser 12 may be modulated to generate frequency excursions from a base frequency to a peak frequency in order to generate frequency modulated pulses. One or both of the base and peak frequency preferably lie on the transmission edge.

The transmission function of the OSR 16 and the base and peak frequency of the laser 12 may be chosen such that the duty cycles of the amplitude modulation and frequency modulation are not equal. In particular, the duty cycle of the frequency modulation at the output of the OSR 16 may be shorter than that of the amplitude modulation. For example, the duty cycle of the frequency modulation may be at least fifteen percent, preferably at least 25 percent, shorter than the duty cycle of the amplitude modulation. In this manner, the leading and trailing portions of a pulse will have a lower frequency, which tends to keep the optical energy at the center of the pulse. Distortions will therefore tend to propagate away from the center of the pulse and isolated 1 bits will be narrower after propagation.

The laser 12 and OSR 16 may include any of the lasers, OSRs, and modulation methods described in the following applications, which are hereby incorporated herein by reference:

(i) U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM;

(ii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) U.S. patent application Ser. No. 11/441,944, filed May 26, 2006 by Daniel Mahgerefteh et al. for FLAT DISPERSION FREQUENCY DISCRIMINATOR (FDFD);

(iv) U.S. patent application Ser. No. 11/037,718, filed Jan. 18, 2005 by Yasuhiro Matsui et al. for CHIRP MANAGED DIRECTLY MODULATED LASER WITH BANDWIDTH LIMITING OPTICAL SPECTRUM RESHAPER;

(v) U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT;

(vi) U.S. patent application Ser. No. 11/084,633 filed Mar. 18, 2005 by Daniel Mahgerefteh et al. for METHOD AND APPARATUS FOR TRANSMITTING A SIGNAL USING SIMULTANEOUS FM AND AM MODULATION; and (vii) U.S. patent application Ser. No. 11/084,630, filed Mar. 18, 2005 by Daniel Mahgerefteh et al. for FLAT-TOPPED CHIRP INDUCED BY OPTICAL FILTER EDGE.

An imaging lens 18 and isolator 20 may be positioned between the laser 12 and the OSR 16 to focus the laser output on the OSR and to prevent back reflection into the cavity of the laser 12, respectively.

A wavesplitter 22 positioned between the laser 12 and the OSR 16 directs some of the output of the laser 12 to a photodiode 24. A second wavesplitter 26 positioned on the opposite side of the OSR 16 from the wavesplitter 22 directs a fraction of the output of the OSR 16 to a second photodiode 28. The outputs of the photodiodes 24, 28 are input to a controller that controls the temperature of a thermoelectric cooler (TEC) 30 to which the laser 12 is mounted. The temperature of the TEC is controlled to maintain the frequency of the laser in alignment with the transmission edge of the OSR 16 by ensuring that a ratio of the outputs of the photodiodes 24, 28 remains at a predetermined value.

Referring to FIGS. 2A and 2B while still referring to FIGS. 1A and 1B, the output of the OSR 16 is particularly tolerant to second-order dispersion. Isolated 1 bits in the frequency reshaped output of the OSR 16 have a center frequency higher than the wings, the pulse therefore propagates through a dispersive fiber 36 without experiencing significant second-order dispersion upon detection by a receiver 38.

As is apparent in FIG. 2A, a pulse having a typical Gaussian profile will develop a spurious peak 32 at its leading edge following propagation through a fiber having only third-order dispersion. However, as is apparent in FIG. 2B, a pulse output from the OSR 16 of the transmitter 10 will develop a similar spurious peak 34 after experiencing only second-order dispersion. In the illustrated example, the dispersion in the example FIG. 1B has a sign opposite that in the example of FIG. 1A such that the spurious peak 34 occurs on the trailing edge.

Accordingly, the output of the OSR 16 is passed through a third-order dispersive element 40 that imposes third-order dispersion on the output of the OSR 16 effective to reverse the spurious peaks caused by the second-order dispersion of the fiber. In some embodiments the third-order dispersive element 40 imposes third-order dispersion on the output of the OSR 16 effective to reverse third-order dispersion within the OSR 16. In still other embodiment, the third-order dispersion of the element 40 imposes third-order dispersion sufficient to compensate for third-order dispersion of the OSR 16 and for spurious peaks caused by second-order dispersion within the fiber.

The required third-order dispersion may be accomplished by means of a filter having a Gaussian profile. In a preferred embodiment, the frequency band (e.g. a band containing 98% of the optical energy) of the output of the OSR 16 is preferably located on the Gaussian transmission profile of the filter such that output signals will experience third-order dispersion. For a Gaussian transmission profile, third-order dispersion occurs near the peak transmission frequency.

Figure 3B:
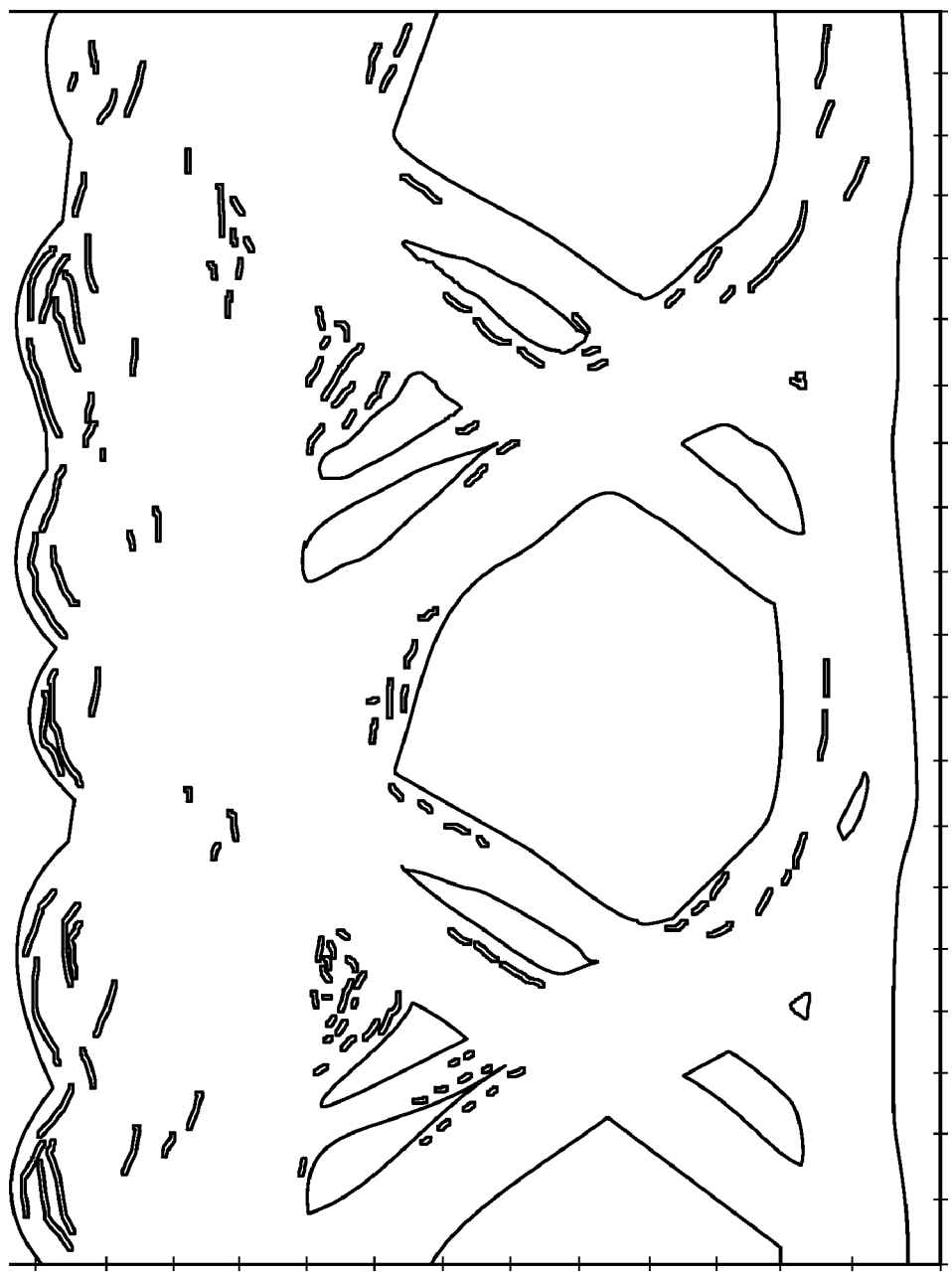
FIG. 3B illustrates an eye diagram for a frequency reshaped pulse having third-order dispersion compensation after transmission through 400 km of fiber.

Referring to FIG. 3A, without the use of the third-order dispersive element 40, the signal detected at a receiver 38 following propagation through 400 km of fiber manifests a large amount of noise and an indiscernible data eye. In contrast, as is apparent in FIG. 3B, where a third-order dispersive element 40 is used the data eye remains open after 400 km.

Referring again to FIGS. 1A and 1B, in some embodiments, an all-pass filter 42 receives the output of the third-order dispersive element 40. The all-pass filter 42 imposes second-order dispersion on optical signals transmitted therethrough. The all-pass filter 42 preferably imposes second-order dispersion having a sign opposite that of the optical fiber 36. The all-pass filter is preferably designed to have a substantially frequency independent transmission function across the bandwidth of the output of the OSR 16.

Referring specifically to FIG. 1A, the OSR 16, third-order dispersive element 40, and all-pass filter 42 may be embodied as solid multi-cavity etalons, such as Gire-Tournois filters 44, 46, and 48, respectively. The spectral response of the filters 44, 46, 48 may be tuned by adjusting the angle of the filters 44, 46, 48 and then bonding them in place. Further tuning may be accomplished by adjusting the temperature of the filters 44, 46, 48, either through localized heating or a thermoelectric cooler underlying all of the filters 44, 46, 48. In the embodiment of FIG. 1A, an optical isolator 50 may be positioned between the OSR 16 and third-order dispersive element 40 to suppress back reflection. The all-pass filter 42 includes two Gire-Tournois filters 48 in the illustrated embodiment. In the embodiment of FIG. 1A the optical transmitter 10 is coupled to the fiber 36 by means of coupling optics such as a fiber pigtail 52. A lens 54 may be used to focus the output of the transmitter on the fiber pigtail 52.

Referring specifically to FIG. 1B, the OSR 16, third-order dispersive element 40, and all-pass filter 42 may also be embodied as ring resonator filters 56, 58, and 60, respectively, integrated in a planar lightwave circuit (PLC) 62. In such embodiments, signals from the laser 12 may be transmitted into an input waveguide 64. A tap splitter 66 diverts some of the light from the input waveguide 64 to photodiode 24. The ring resonator filter 56 of the OSR 16 couples a portion of the light from the input waveguide 64 to an output waveguide 72. In the illustrated embodiment, the ring resonator filter 56 functioning as the OSR 16 includes multiple ring resonators such as are described in U.S. patent application Ser. No. 11/702,436 filed Feb. 5, 2007. A tap splitter 74 directs a portion of light transmitted through the output waveguide 72 to the photodiode 28.

The ring resonator filter 58 functioning as the third-order dispersive element 40 is positioned adjacent the output waveguide 72. The ring resonator filter 60 serving as the all-pass filter is likewise positioned adjacent the output waveguide 72. In the illustrated embodiment, the ring resonator filter 60 includes two sets of three resonator rings, each set having one resonator ring adjacent the output waveguide 72.

Coupling optics, such as a fiber pigtail 52 couple the optical fiber 36 to the PLC 62 such that light from the output waveguide 72 is transmitted into the fiber 36.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmitter comprising:
a digital signal source configured to output a data signal;
an optical signal source coupled to the digital signal source and configured to output a frequency modulated signal encoding the data signal;
an optical spectrum reshaper positioned to receive the frequency modulated signal and adapted to convert the frequency modulated signal into a reshaped signal having increased amplitude modulation relative to the frequency modulated signal;
a third-order dispersive element positioned to receive the reshaped signal and adapted to impose third-order dispersion on the reshaped signal to generate a compensated signal; and
an optical fiber having a first end positioned to receive the compensated signal and a second end coupled to a receiver; and
wherein the third-order dispersive element imposes third-order dispersion effective to compensate for second-order dispersion caused by the optical fiber.

2. The optical transmitter of claim 1, wherein the an optical spectrum reshaper is adapted to convert the frequency modulated signal into a reshaped signal having amplitude and frequency modulation, wherein a duty cycle of the amplitude modulation is greater than a duty cycle of the frequency modulation.

3. The optical transmitter of claim 1, wherein the third-order dispersive element is a filter having a Gaussian profile and wherein the reshaped signal has a frequency profile positioned relative to the transmission function of the Gaussian profile such that the reshaped signal experiences third-order dispersion.

4. The optical transmitter of claim 1, further comprising a second-order dispersive element having second-order dispersion having a sign opposite that of second-order dispersion in the optical fiber and positioned between the third-order dispersive element and the optical fiber.

5. The optical transmitter of claim 4, wherein the second-order dispersive element comprises an all-pass filter.

6. The optical transmitter of claim 4, wherein the second-order dispersive element comprises at least one ring resonator filter.

7. The optical transmitter of claim 4, wherein the second-order dispersive element comprises two Gire-Tournois filters.

8. A method for transmitting data comprising:
modulating an optical signal source to generate a first signal having frequency modulation encoding a data signal;
transmitting the first signal through an optical spectrum reshaper to generate a second signal having amplitude and frequency modulated pulses encoding the data signal, the pulses having a center portion and leading and trailing portions, the leading and trailing portions having a lower frequency than the center portion;
transmitting the second signal through a third-order dispersive element to generate a third signal; and
transmitting the third signal through an optical fiber to a receiver, the third-order dispersive element imposing third-order dispersion effective to compensate for distortion caused by second-order dispersion of the optical fiber.

9. The method of claim 8, wherein transmitting the second signal through a third-order dispersive element to generate a third signal comprises transmitting the second signal through an optical filter having a Gaussian profile, the second signal having a frequency profile positioned on the transmission function of the Gaussian profile such that the reshaped signal experiences third-order dispersion.

10. The method of claim 8, further comprising transmitting the third signal through a second-order dispersive element having second-order dispersion having a sign opposite that of the optical fiber.

11. The method of claim 10, wherein the second-order dispersive element comprises at least one of a ring resonator filter and a Gire-Tournois filter.

12. An optical transmitter comprising:
a digital signal source configured to output a data signal;
an optical signal source coupled to the digital signal source and configured to output a frequency modulated signal encoding the data signal;
an optical spectrum reshaper positioned to receive the frequency modulated signal and output a reshaped signal, the optical spectrum reshaper having a transmission function having a transmission edge overlapping a frequency modulation bandwidth of the frequency modulated signal; and
an optical filter having a transmission function having a portion overlapping the transmission edge that is effective to impose third-order dispersion on the reshaped signal.

13. The optical transmitter of claim 12, further comprising an optical fiber having a first end positioned to receive the compensated signal and a second end coupled to a receiver;

and wherein the optical filter imposes third-order dispersion effective to compensate for second-order dispersion caused by the optical fiber.

14. The optical transmitter of claim 13, further comprising a second-order dispersive element having second-order dispersion having a sign opposite that of the optical fiber and positioned between the third-order dispersive element and the optical fiber.

15. The optical transmitter of claim 14, wherein the second-order dispersive element comprises an all-pass filter.

16. The optical transmitter of claim 15, wherein the second-order dispersive element comprises at least one of a ring resonator filter and a Gire-Tournois filter.

17. An optical transmitter comprising:
a digital signal source configured to output a data signal;
an optical signal source coupled to the digital signal source and configured to output a frequency modulated signal encoding the data signal;
an optical spectrum reshaper positioned to receive the frequency modulated signal and adapted to convert the frequency modulated signal into a reshaped signal having increased amplitude modulation relative to the frequency modulated signal;
a third-order dispersive element positioned to receive the reshaped signal and adapted to impose third-order dispersion on the reshaped signal to generate a compensated signal, the third-order dispersive element having a transmission function effective to substantially reverse third-order dispersion imposed by the optical spectrum reshaper.

18. The optical transmitter of claim 17, wherein the third-order dispersive element has a Gaussian transmission profile and wherein the reshaped signal has a frequency bandwidth positioned on the Gaussian transmission profile such that the reshaped signal experiences third-order dispersion.

19. The optical transmitter of claim 17, further comprising an optical fiber having a first end positioned to receive the compensated signal and a second end coupled to a receiver; and wherein the optical filter imposes third-order dispersion effective to compensate for second-order dispersion caused by the optical fiber.

20. The optical transmitter of claim 17, further comprising a second-order dispersive element having second-order dispersion having a sign opposite that of the second-order dispersion in the optical fiber and positioned between the third-order dispersive element and the optical fiber.

21. The optical transmitter of claim 20, wherein the second-order dispersive element comprises an all-pass filter.

* * * * *